Patented Aug. 4, 1931

1,817,670

UNITED STATES PATENT OFFICE

HARVEY C. BRILL, OF CAMBRIDGE, MASSACHUSETTS

LOCAL ANÆSTHETIC

No Drawing.   Application filed October 1, 1928. Serial No. 309,693.

This invention relates to local anæsthetics.

I have found that the aromatic esters of the general formula

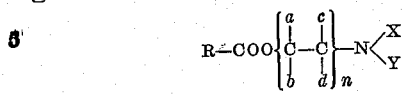

in which R may be any aromatic radical, $a$, $b$, $c$ and $d$ may be either hydrogen atoms or alkyl radicals, $n$ the number of carbon atoms in the chain, X an alkyl radical containing four or more carbon atoms, and Y either a methyl or ethyl radical, possess local anæsthetic action similar to cocaine and are devoid of the narcotic action of cocaine. To avoid repetition of expression, whenever hereinafter the language "member of the above series", or "members of the above series" is used, it will be understood that the general formula,

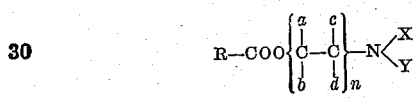

with its concomitant meanings, as outlined, will be referred to.

The members of the above series are, in general, colorless compounds, oils or low-melting solids, little soluble in water, more readily soluble in alcohol or ether, of alkaline reaction to litmus, decomposed upon heating with acids or alkalies into the component aromatic acid and amino-alcohol, and capable of forming salts with acids. Both the esters and their salts have the property of producing local anæsthesia similar to cocaine.

To prepare a member of the above series, the process may be carried out, for instance, as follows:

40 parts, by weight, of beta-normal butyl ethyl aminoethanol are dissolved in 40 parts, by weight, of benzol, and to this solution are added gradually 47 parts, by weight, of cinnamoyl chloride dissolved in 100 parts of benzol. After recrystallization from alcohol, the precipitate, namely, the hydrochloride of the cinnamic ester of beta-normal butyl ethyl aminoethanol is obtained as white crystals, melting at 151° C. The reaction expressing the chemical change, involved in the formation of this particular member of the above series, may be written as follows:—

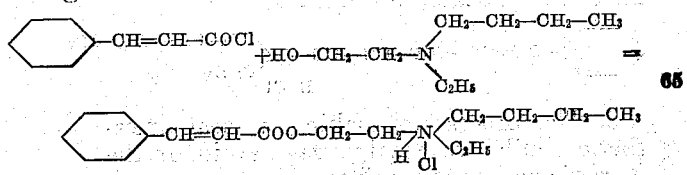

From an aqueous solution of this salt, sodium carbonate liberates the free base, namely, the cinnamic ester of beta-normal butyl ethyl aminoethanol, as a colorless, low-melting solid, little soluble in water, more readily soluble in alcohol or ether, of alkaline reaction to litmus, decomposed upon heating with sodium hydroxide into sodium cinnamate and beta-normal butyl ethyl aminoethanol, forming with hydrochloric acid a hydrochloride melting at 151° C., and having the property of producing local anæsthesia similar to cocaine, substantially as described.

In an analogous or different manner other members of the above series may be obtained.

Having now described my invention, what I claim is:

1. As new products, the aromatic esters of the general formula

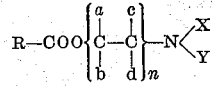

in which R comprises a cinnamic acid, $a$, $b$, $c$ and $d$ may be either hydrogen atoms or alkyl radicals, $n$ a whole number signifying the number of carbon atoms disposed in the chain, X an alkyl radical containing four or more carbon atoms, and Y either a methyl or ethyl radical, being, in general, colorless compounds, oils or low-melting solids, little soluble in water, more readily soluble in alcohol or ether, of alkaline reaction to litmus, decomposed upon heating with acids or alkalies into the component aromatic acid and amino-alcohol, capable of forming salts with acids, from which salts the free base is liberated by means of sodium carbonate, and having the property of producing local anæsthesia similar to cocaine, yet devoid of the narcotic action of cocaine.

2. As a new product, the cinnamic ester of beta-normal butyl ethyl aminoethanol, being a colorless compound, little soluble in water, more readily soluble in alcohol or ether, of alkaline reaction to litmus, decomposed upon heating with sodium hydroxide into sodium cinnamate and beta-normal butyl ethyl aminoethanol, capable of forming a hydrochloride melting at 151° C., from the aqueous solution of which salt the free base, namely, the cinnamic ester of beta-normal butyl ethyl aminoethanol, is liberated as a colorless, low-melting solid by means of sodium carbonate, and having the property of producing local anæsthesia similar to cocaine, yet devoid of the narcotic action of cocaine and having the following probable formula:

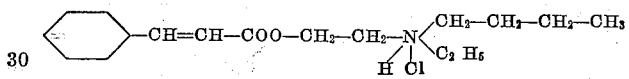

3. The process of making a local anæsthetic similar to cocaine yet devoid of the narcotic action of cocaine, said process, comprising, reacting beta-normal butyl ethyl aminoethanol and cinnamoyl chloride to form a hydrochloride of the cinnamic ester of beta-normal butyl ethyl aminoethanol.

In witness whereof, I hereunto subscribe my name.

HARVEY C. BRILL.